(12) United States Patent
Scott

(10) Patent No.: US 7,080,657 B1
(45) Date of Patent: *Jul. 25, 2006

(54) FUEL TANK VENTING SYSTEM

(76) Inventor: William A. Scott, W105403 Pleasant Acres, Summit Lake, WI (US) 54485

( * ) Notice: Subject to any disclaimer, the term of this patent is extended or adjusted under 35 U.S.C. 154(b) by 70 days.

This patent is subject to a terminal disclaimer.

(21) Appl. No.: 11/004,296

(22) Filed: Dec. 3, 2004

Related U.S. Application Data

(63) Continuation-in-part of application No. 10/846,296, filed on May 14, 2004, now Pat. No. 6,866,056.

(51) Int. Cl.
F16K 15/14 (2006.01)
F16K 24/06 (2006.01)
B60K 15/035 (2006.01)

(52) U.S. Cl. .................. 137/15.18; 137/526; 137/587; 220/746; 251/331

(58) Field of Classification Search ................ 137/526, 137/587, 588, 590; 220/203.16, 203.18, 220/746; 251/331
See application file for complete search history.

(56) References Cited

U.S. PATENT DOCUMENTS

| 5,259,412 A * | 11/1993 | Scott et al. ................ 137/588 |
| 6,000,426 A * | 12/1999 | Tuckey et al. ............. 137/588 |
| 6,003,499 A * | 12/1999 | Devall et al. .............. 123/520 |
| 6,866,056 B1 * | 3/2005 | Scott ....................... 137/15.18 |

* cited by examiner

Primary Examiner—Ramesh Krishnamurthy
(74) Attorney, Agent, or Firm—Donald J. Ersler

(57) ABSTRACT

A fuel tank venting system includes a fuel cap, a vent diaphragm and a vent disc. A valve cavity with a substantially concave bottom is formed in a bottom of the fuel cap. At least one air passage is formed through the vent disc. A substantially convex surface is formed on a top of the diaphragm projection. The vent diaphragm is retained between the substantially concave bottom and the substantially convex surface. When air is needed for fuel flow, a vacuum within the fuel tank pulls the perimeter of the vent diaphragm downward, which breaks a seal with the substantially concave bottom to allow air flow. In a second embodiment, the fuel tank venting system is contained in a wall of the fuel tank. In a third embodiment, the fuel tank venting system is contained in a fuel vent body, which is attached to the fuel tank.

14 Claims, 3 Drawing Sheets

FUEL TANK VENTING SYSTEM

CROSS-REFERENCES TO RELATED APPLICATIONS

This is a continuation-in-part patent application taking priority from a utility patent application having Ser. No. 10/846,296 filed on May 14, 2004 now U.S. Pat. No. 6,866,056.

BACKGROUND OF THE INVENTION

1. Field of the Invention

The present invention relates generally to venting fuel tanks and more specifically to a fuel tank venting system, which may be located in a fuel cap or in a wall of the fuel tank.

2. Discussion of the Prior Art

Fuel tanks used with small engines usually allow fuel vapors to continually vent to the atmosphere. Sometimes check valves are incorporated in the gas cap to prevent the escape of fuel vapors. Some types of check valves seal well under high pressure, but allow fuel vapor seepage under low pressure. With marine fuel tanks, a thumb screw in the fuel cap is used to seal the marine fuel tank, when not in use. The thumb screw is opened in most cases to run the engine. During the time when the engine is running, fuel vapors are vented to the atmosphere. Some users may never tighten the thumb screw for the sake of convenience, allowing the escape of fuel vapors from the marine fuel tank, at all times.

Accordingly, there is a clearly felt need in the art for a fuel tank venting system to prevent fuel vapors from being vented to the atmosphere, while allowing atmospheric air to enter the fuel tank for the purpose of fuel flow.

SUMMARY OF THE INVENTION

The present invention provides a fuel tank venting system for the purpose of providing fuel flow to an engine. The fuel tank venting system includes a fuel cap, a vent diaphragm and a vent disc. An air filter is preferably disposed in a top of the fuel cap. A threaded bore is formed in a bottom of the fuel cap to threadably receive a fuel tank fill spout. A valve cavity with a substantially concave bottom is formed adjacent the threaded bore. The vent disc preferably includes a disc flange and a diaphragm projection. At least one air passage is formed through the disc flange. A disc counter bore is formed in a bottom of the fuel cap, adjacent the valve cavity to receive the disc flange of the vent disc. A substantially convex surface is preferably formed on a top of the diaphragm projection. The vent diaphragm is retained between the substantially concave bottom of the valve cavity and the substantially convex surface of the diaphragm projection. The vent diaphragm is fabricated from a flexible material with memory. When air is needed for fuel flow, a vacuum within the fuel tank pulls the perimeter of the vent diaphragm downward, which breaks a seal with the substantially concave bottom. Air flows around the unsealed perimeter of the vent diaphragm through the at least one air passage. When the vacuum ceases, the vent diaphragm returns to its original sealing position, which does not allow fuel vapors into the atmosphere.

A second embodiment of the fuel tank venting system includes a vent body, the vent diaphragm and the vent disc. An air filter is preferably disposed in a top of the vent body. A body opening is preferably formed in a wall of a fuel tank that is sized to receive an outer perimeter of the vent body. A valve cavity with a substantially concave bottom is formed in a bottom of the vent body. A disc counter bore is formed in a bottom of the vent body to receive the disc flange of the vent disc. The vent diaphragm is first inserted into valve cavity. The vent disc is then inserted into the disc counter bore. The vent diaphragm is retained between the substantially concave bottom of the valve cavity and the substantially convex surface of the diaphragm projection.

When air is needed for fuel flow, a vacuum contained in the fuel tank pulls the perimeter of the vent diaphragm downward, which breaks a seal with the substantially concave bottom. Air flows around the unsealed perimeter of the vent diaphragm through the at least one air passage. When the vacuum ceases, the vent diaphragm returns to its original sealing position, which does not allow fuel vapors into the atmosphere.

A third embodiment of the fuel tank venting system includes a fuel vent body, the vent diaphragm and the vent disc. An air filter is preferably disposed in a top of the fuel vent body. A clearance opening is preferably formed in a wall of a fuel tank that is sized to allow air flow through the vent disc. A valve cavity with a substantially concave bottom is formed in a bottom of the fuel vent body. A disc counter bore is formed in a bottom of the vent body to receive the disc flange of the vent disc. The vent diaphragm is first inserted into valve cavity. The vent disc is then inserted into the disc counter bore. The vent diaphragm is retained between the substantially concave bottom of the valve cavity and a substantially convex surface of the diaphragm projection.

A fuel pass through is also formed in the fuel vent body. Preferably, a first fuel bore is formed in a bottom of the fuel vent body and a second fuel bore is formed in a side of the fuel vent body. The first fuel bore communicates with the second fuel bore to allow the flow of fuel therethrough. A first fuel tube is inserted into the first fuel bore and a second fuel tube is inserted into the second fuel bore. One end of a first fuel hose is terminated with a fuel filter and the other end is secured over the first fuel tube. One end of a second fuel hose is secured over the second fuel tube and the other end is connected to an internal combustion engine.

When air is needed for fuel flow, a vacuum contained in the fuel tank pulls the perimeter of the vent diaphragm downward, which breaks a seal with the substantially concave bottom. Air flows around the unsealed perimeter of the vent diaphragm through the at least one air passage. When the vacuum ceases, the vent diaphragm returns to its original sealing position, which does not allow fuel vapors into the atmosphere.

Accordingly, it is an object of the present invention to provide a fuel tank venting system to prevent fuel vapors from being vented to the atmosphere, while allowing atmospheric air to enter the fuel tank for the purpose of fuel flow to an engine.

These and additional objects, advantages, features and benefits of the present invention will become apparent from the following specification.

DETAILED DESCRIPTION OF THE PREFERRED EMBODIMENTS

Figure 1:
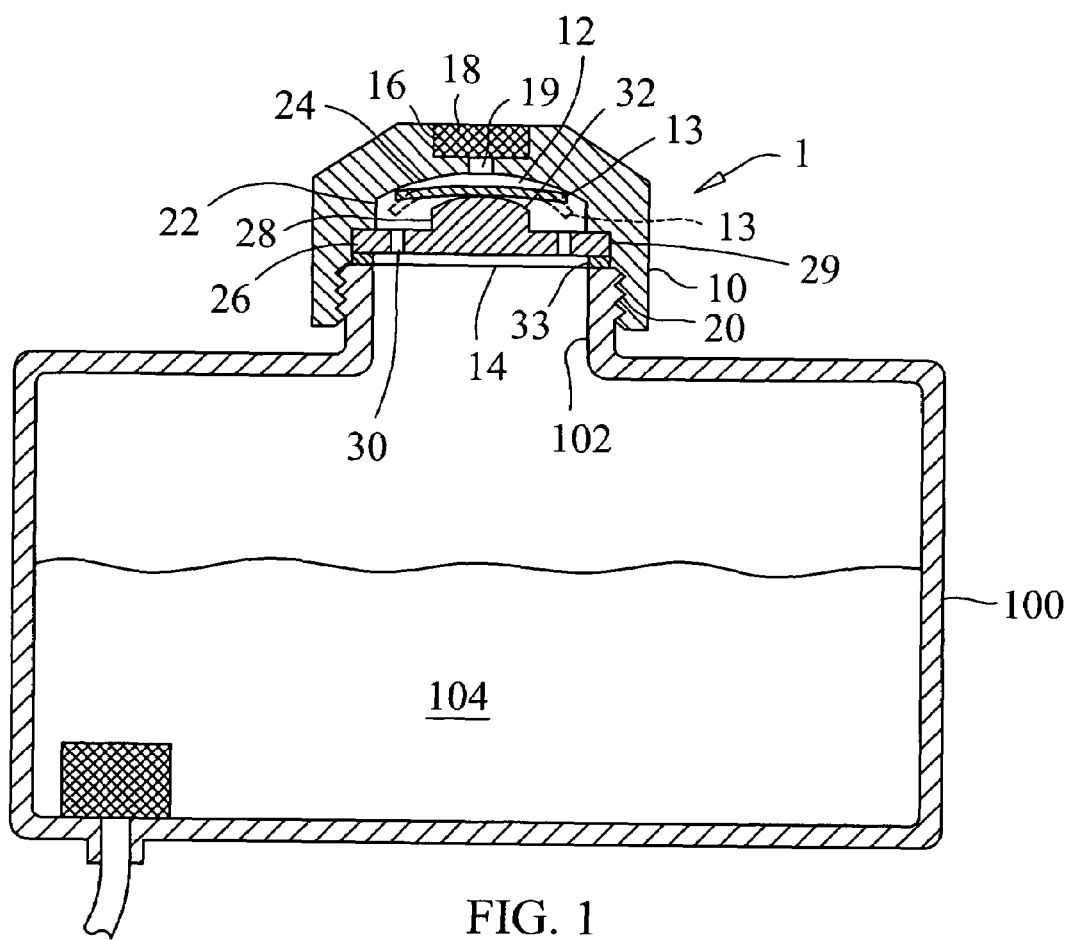
FIG. 1 is a cross sectional view of a fuel tank venting system contained in a fuel cap, the fuel cap is retained on a fuel spout of a fuel tank in accordance with the present invention.
Figure 2:
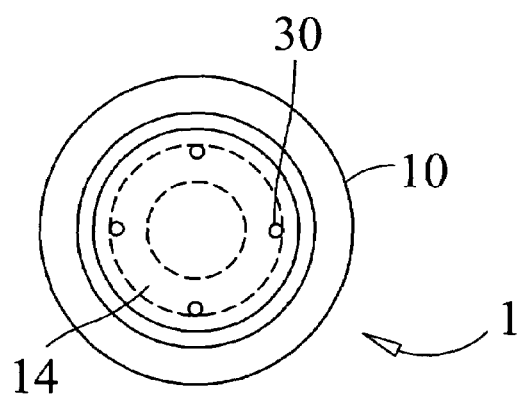
FIG. 2 is a bottom view of a fuel cap of a fuel tank venting system contained therein in accordance with the present invention.
Figure 3:
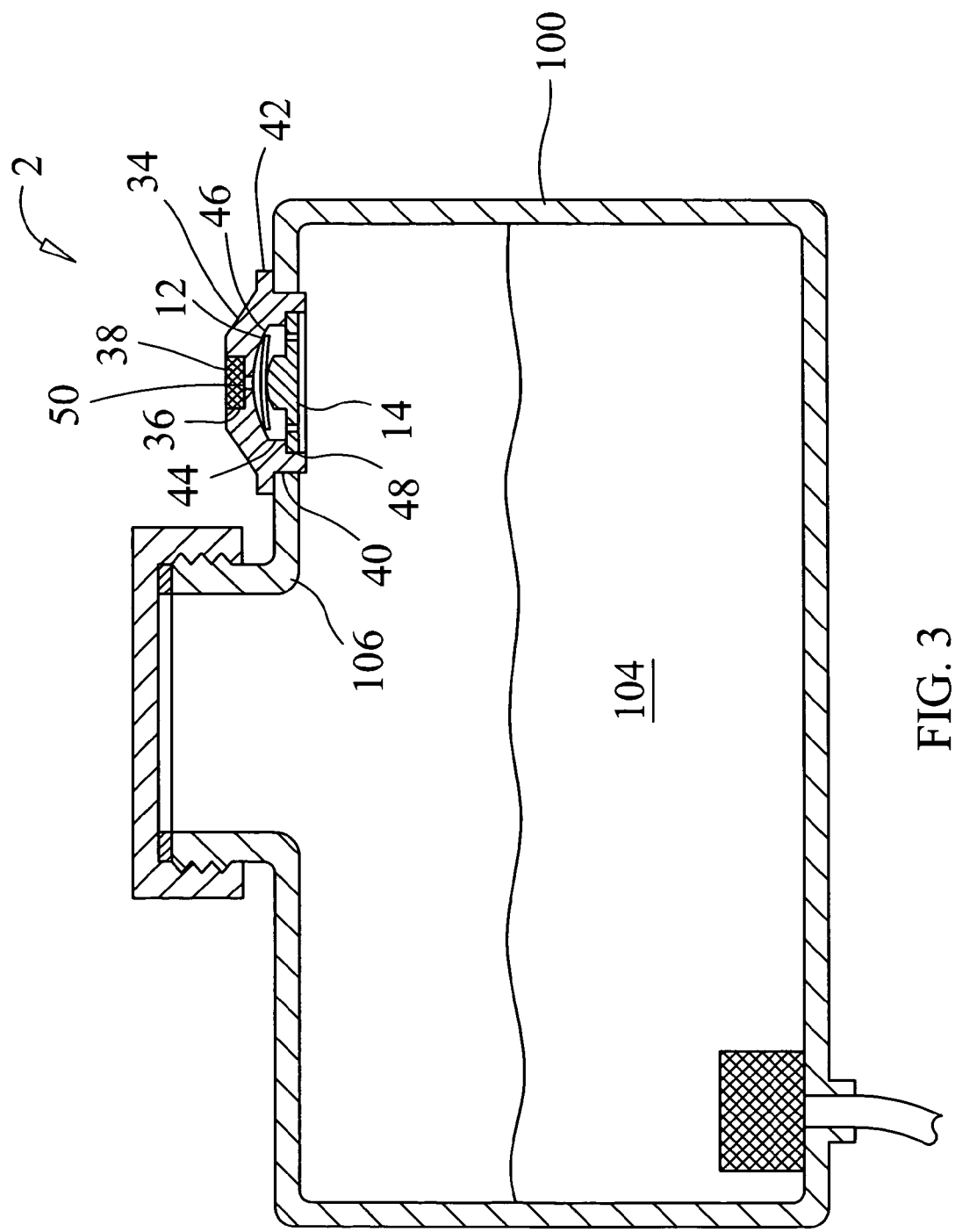
FIG. 3 is a cross sectional view of a second embodiment of a fuel tank venting system retained in a wall of the fuel tank in accordance with the present invention.
Figure 4:
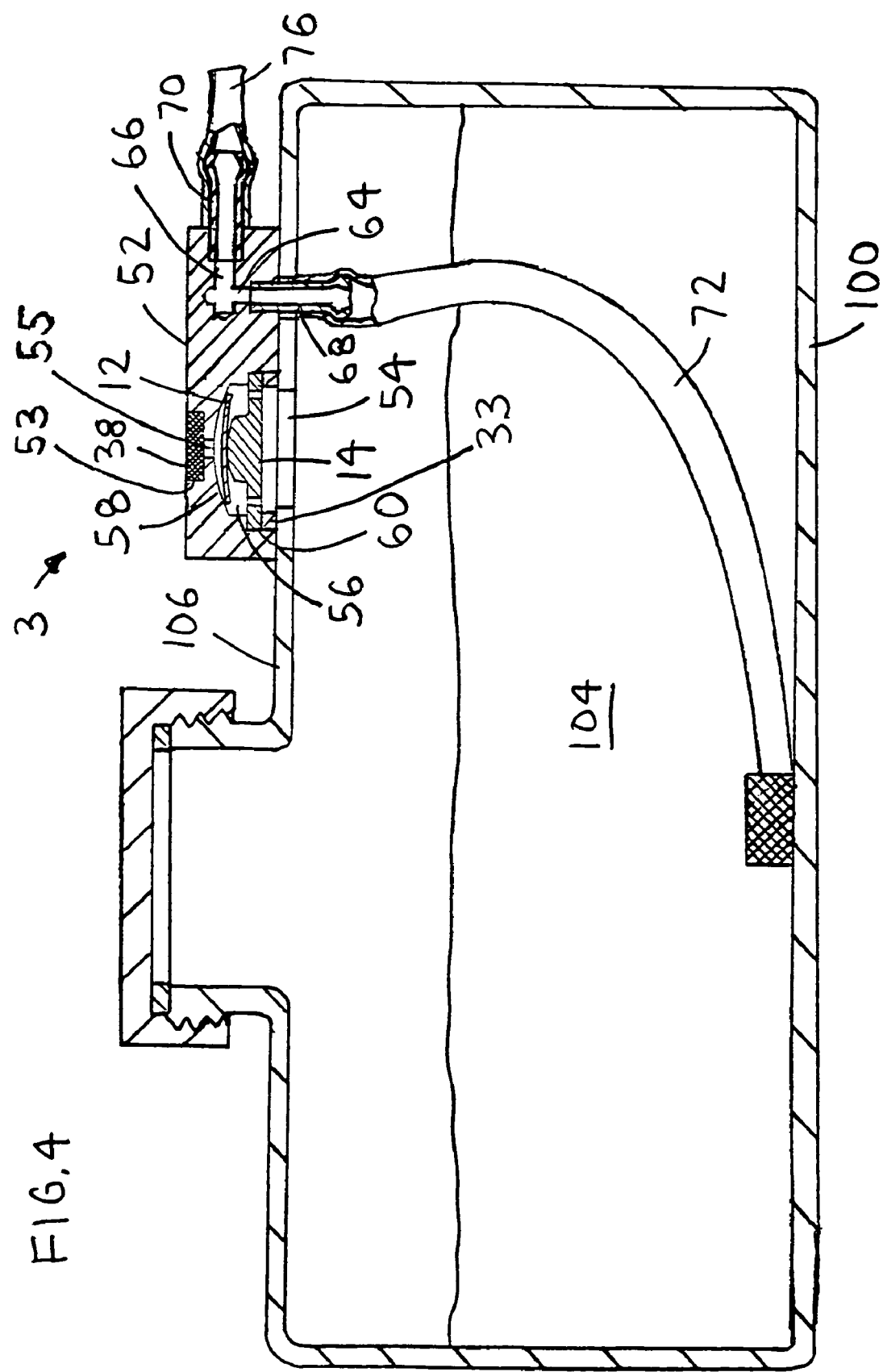
FIG. 4 is a cross sectional view of a third embodiment of a fuel tank venting system retained adjacent a wall of the fuel tank in accordance with the present invention.

With reference now to the drawings, and particularly to FIG. 1, there is shown a cross sectional view of a fuel tank venting system 1. With reference to FIG. 2, the fuel tank venting system 1 preferably includes a fuel cap 10, a vent diaphragm 12 and a vent disc 14. A filter cavity 16 is preferably formed in a top of the fuel cap 10 to receive an air filter 18. A threaded bore 20 is preferably formed in a bottom of the fuel cap 10 to threadably receive a fuel tank fill spout 102 of a fuel tank 100. A valve cavity 22 with a substantially concave bottom 24 is formed adjacent the threaded bore 20. A flow passage 19 is formed through the filter cavity 16 to the substantially concave bottom 24. The vent disc 14 preferably includes a disc flange 26 and a diaphragm projection 28. A disc counter bore 29 is formed in a bottom of the fuel cap, adjacent the valve cavity 22 to receive the disc flange 26. The vent disc 14 is retained in the disc counter bore 29 with a force fit, adhesive or any other suitable method. At least one air passage 30 is formed through the disc flange 26, but may be formed through the diaphragm projection 28. A substantially convex surface 32 is preferably formed on a top of the diaphragm projection 28. A seal gasket 33 may be retained, adjacent a bottom of the disc flange 26.

The vent diaphragm 12 is retained between the substantially concave bottom 24 of the valve cavity 22 and the substantially convex surface 32 of the diaphragm projection 28. The vent diaphragm 12 is fabricated from a flexible material with memory. The vent diaphragm 12 has provided satisfactory performance, when fabricated from the fluoroelastomer Viton, manufactured by DuPont Dow, but other materials may also be used.

When air is needed to facilitate fuel flow to an engine, a vacuum within the fuel tank 100 pulls the diaphragm perimeter 13 of the vent diaphragm 12 downward, which breaks a seal between the diaphragm perimeter 13 of the vent diaphragm 12 and the substantially concave bottom 24. Air flows around the unsealed diaphragm perimeter 13 and through the at least one air passage 30. When the vacuum inside the fuel tank 100 ceases, the vent diaphragm 12 returns to its original sealing position, which does not allow fuel vapors into the atmosphere from fuel 104 in the fuel tank 100.

The amount of vacuum (negative pressure) to unseal the vent diaphragm 12 from the substantially concave bottom 24 may be decreased by decreasing the thickness of the vent diaphragm 12 and/or increasing the surface area (perimeter) of the vent diaphragm 12. The amount of vacuum generated by a gravity feed fuel system is less than that of a fuel pump feed fuel system. Further, a fuel tank filled with fuel generates more vacuum than a nearly empty fuel tank. The size and thickness of the vent diaphragm must be calibrated according to the type of fuel feed system and the vacuum generated when the fuel tank is full and nearly empty.

A second embodiment of the fuel tank venting system 2 includes a vent body 34, the vent diaphragm 12 and the vent disc 14. A filter cavity 36 is preferably formed in a top of the vent body 34 to receive the air filter 38. A body opening 40 is formed through a wall 106 of a fuel tank 100 that is sized to receive an outer perimeter of the vent body 34. A flange 42 preferably extends from a perimeter of the vent body 34. The vent body 34 may be attached to the fuel tank 100 by welding, threading or any other suitable process. A valve cavity 44 with a substantially concave bottom 46 is formed in a bottom of the vent body 34. A flow passage 50 is formed through the filter cavity 36 to the substantially concave bottom 46. A disc counter bore 48 is formed in a bottom of the vent body 34 to receive an outer perimeter of the vent disc 14.

The vent diaphragm 12 is first inserted into the valve cavity 44. The vent disc 14 is then inserted into the disc counter bore 48. The vent disc 14 is retained in the disc counter bore 48 with a force fit, adhesive or any other suitable method. The vent diaphragm 12 is retained between the substantially concave bottom 46 of the valve cavity 44 and the substantially convex surface 32 of the diaphragm projection 28. When air is needed to facilitate fuel flow to an engine, a vacuum within the fuel tank 100 pulls the diaphragm perimeter 13 of the vent diaphragm 12 downward, which breaks a seal between the diaphragm perimeter 13 of the vent diaphragm 12 and the substantially concave bottom 46. Air flows around the unsealed diaphragm perimeter 13 and through the at least one air passage 30. When the vacuum inside the fuel tank 100 ceases, the vent diaphragm 12 returns to its original sealing position, which does not allow fuel vapors into the atmosphere from the fuel 104 in the fuel tank 100.

The vent diaphragm 12 acts as a check valve to allow air into the fuel tank 100, but not allow fuel vapors to escape the fuel tank 100. The shape of the vent diaphragm 12 and the vent disc 14 are shown as being round, but may be formed in any suitable shape.

A third embodiment of the fuel tank venting system 3 includes a fuel vent body 52, the vent diaphragm 12 and the vent disc 14. A filter cavity 53 is preferably formed in a top of the fuel vent body 52 to receive the air filter 38. The fuel vent body 52 is attached to the fuel tank 100 with any suitable process. A clearance opening 54 is preferably formed in a wall 106 of the fuel tank 100 that is sized to allow air flow through the vent disc 14. A valve cavity 56 with a substantially concave bottom 58 is formed in a bottom of the fuel vent body 52. A flow passage 55 is formed through the filter cavity 53 to the substantially concave bottom 58. A disc counter bore 60 is formed in a bottom of the fuel vent body 52 to receive the disc flange 26 of the vent disc 14. The vent diaphragm 12 is first inserted into valve cavity 56. The vent disc 14 is then inserted into the disc counter bore 60. The vent diaphragm 12 is retained between the substantially concave bottom 58 of the valve cavity 56 and the substantially convex surface 32 of the diaphragm projection 28. The gasket 33 may be inserted between the wall 106 and a bottom of the vent disc 14.

A fuel pass through is also formed in the fuel vent body 52. Preferably, a first fuel bore 64 is formed in a bottom of the fuel vent body 52 and a second fuel bore 66 is formed in a side of the fuel vent body 52. The first fuel bore 64 communicates with the second fuel bore 66 to allow the flow of fuel 104. A first fuel tube 68 is inserted into a first fuel counter bore formed concentric with the first fuel bore 64. A second fuel tube 70 is inserted into a second fuel counter bore formed concentric with the second fuel bore 66. One end of a first fuel hose 72 is terminated with a fuel filter 74 and the other end is secured over the first fuel tube 68. One end of a second fuel hose 76 is secured over the second fuel tube 70 and the other end is connected to an internal combustion engine (not shown).

When air is needed for fuel flow, a vacuum contained in the fuel tank 100 pulls the perimeter 13 of the vent diaphragm 12 downward, which breaks a seal with the substantially concave bottom 58. Air flows around the unsealed perimeter 13 of the vent diaphragm 12 through the at least one air passage 30. When the vacuum ceases, the vent diaphragm 12 returns to its original sealing position, which does not allow fuel vapors into the atmosphere.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of venting air to a fuel tank without allowing fuel vapors to escape to the atmosphere, comprising the steps of:
    providing a vent body having a valve cavity in a bottom thereof, forming at least one flow passage through said vent body to said valve cavity;
    inserting a diaphragm into said valve cavity; and
    inserting a vent disc into a bottom of said vent body, said vent disc including a diaphragm projection, forming at least one air passage through said vent disc, securing said vent body to a wall of the fuel tank, a moveable outer perimeter of said diaphragm sealing a bottom of said valve cavity, a vacuum in the fuel tank unsealing said diaphragm to provide air flow to the fuel tank through said at least one flow passage and said at least one air passage.

2. The method of venting air to a fuel tank without allowing fuel vapors to escape to the atmosphere of claim 1, further comprising the step of:
    providing said valve cavity with a substantially concave bottom.

3. The method of venting air to a fuel tank without allowing fuel vapors to escape to the atmosphere of claim 1, further comprising the step of:
    forming a substantially convex surface on a top of said diaphragm projection.

4. The method of venting air to a fuel tank without allowing fuel vapors to escape to the atmosphere of claim 1, further comprising the step of:
    said diaphragm being fabricated from a flexible material having memory.

5. The method of venting air to a fuel tank without allowing fuel vapors to escape to the atmosphere of claim 1, further comprising the step of:
    forming a filter cavity in a top of said vent body, inserting an air filter into said filter cavity.

6. The method of venting air to a fuel tank without allowing fuel vapors to escape to the atmosphere of claim 1, further comprising the step of:
    providing a fuel vent body for said vent body, routing fuel through said fuel vent body from the fuel tank to an engine.

7. A method of venting air to a fuel tank without allowing fuel vapors to escape to the atmosphere, comprising the steps of:
    providing a vent body having a valve cavity in a bottom thereof, said valve cavity having a substantially concave bottom, forming at least one flow passage through a top of said vent body to said valve cavity;
    inserting a diaphragm into said valve cavity, said diaphragm being fabricated from a flexible material having memory, a moveable outer perimeter of said diaphragm sealing said substantially concave bottom;
    inserting a vent disc into said valve cavity, said vent disc including a diaphragm projection with a substantially convex surface on a top thereof, forming at least one air passage through said vent disc; and
    securing said valve body to a wall of the fuel tank.

8. The method of venting air to a fuel tank without allowing fuel vapors to escape to the atmosphere of claim 7, further comprising the step of:
    forming a filter cavity in a top of said valve body, inserting an air filter into said filter cavity.

9. The method of venting air to a fuel tank without allowing fuel vapors to escape to the atmosphere of claim 7, further comprising the step of:
    providing a fuel vent body for said vent body, routing fuel through said fuel vent body from the fuel tank to an engine.

10. A method of venting air to a fuel tank without allowing fuel vapors to escape to the atmosphere, comprising the steps of:
    providing a vent body having a valve cavity in a bottom thereof, said valve cavity having a substantially concave bottom, forming at least one flow passage through said vent body to said valve cavity;
    inserting a diaphragm into said valve cavity; and
    inserting a vent disc into a bottom of said vent body, said vent disc including a diaphragm projection, forming at least one air passage through said vent disc, securing said vent body to a wall of the fuel tank, a moveable outer perimeter of said diaphragm sealing a bottom of said valve cavity, a vacuum in the fuel tank unsealing said diaphragm to provide air flow to the fuel tank through said at least one flow passage and said at least one air passage.

11. The method of venting air to a fuel tank without allowing fuel vapors to escape to the atmosphere of claim 10, further comprising the step of:
    forming a substantially convex surface on a top of said diaphragm projection.

12. The method of venting air to a fuel tank without allowing fuel vapors to escape to the atmosphere of claim 10, further comprising the step of:
    said diaphragm being fabricated from a flexible material having memory.

13. The method of venting air to a fuel tank without allowing fuel vapors to escape to the atmosphere of claim 10, further comprising the step of:
    forming a filter cavity in a top of said vent body, inserting an air filter into said filter cavity.

14. The method of venting air to a fuel tank without allowing fuel vapors to escape to the atmosphere of claim 10, further comprising the step of:
    providing a fuel vent body for said vent body, routing fuel through said fuel vent body from the fuel tank to an engine.

* * * * *